July 28, 1931.  E. W. MENNINGER  1,816,387
FURRING CONSTRUCTION
Filed Dec. 10, 1925   2 Sheets-Sheet 1
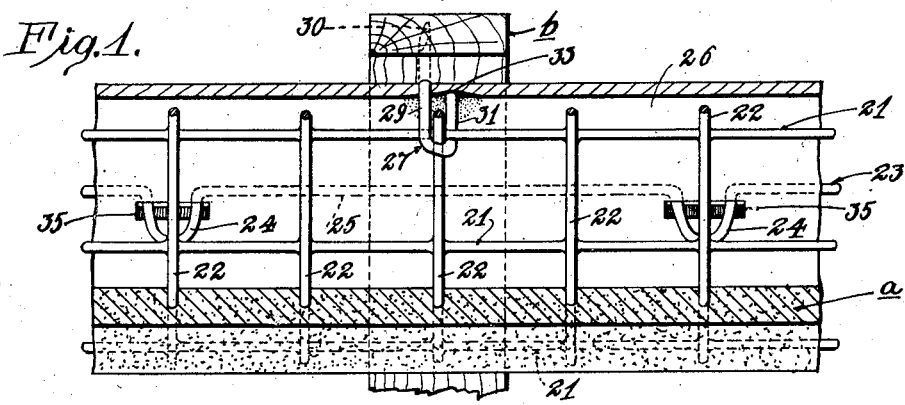
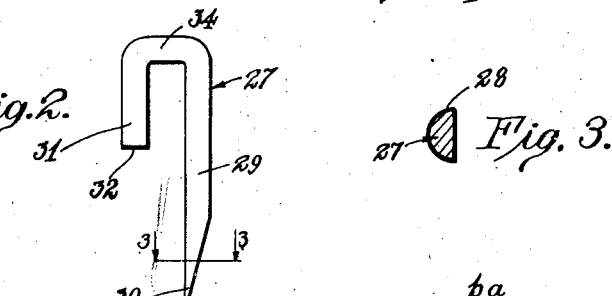
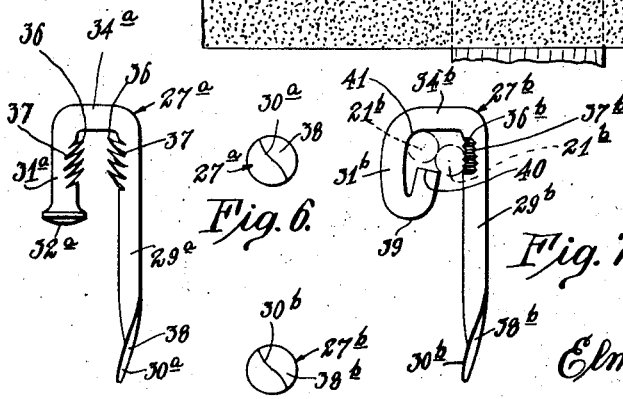
Inventor
Elmore William Menninger.
By Lyon & Lyon
Attorneys.

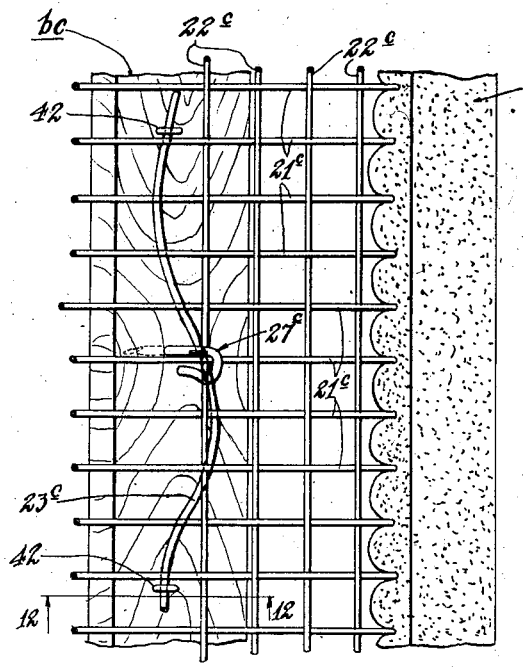
Fig. 9.
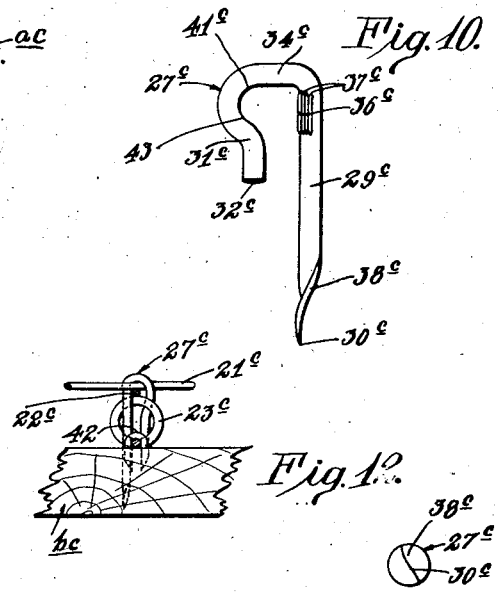
Fig. 10.
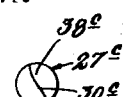
Fig. 11.
Fig. 12.
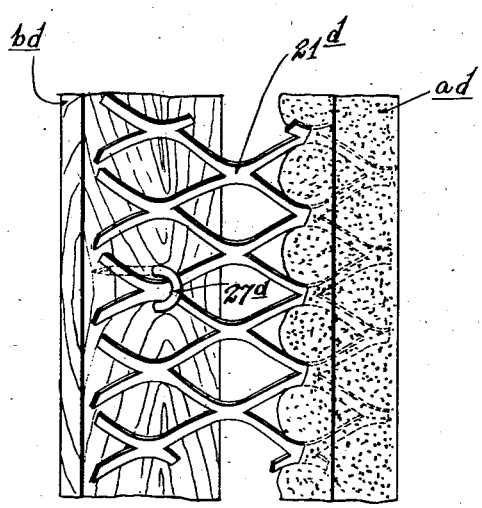
Fig. 13.
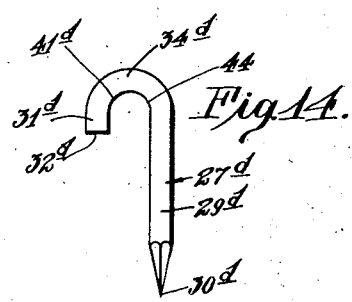
Fig. 14.
Inventor
Elmore William Menninger.
By Lyon & Lyon
Attorneys Patented July 28, 1931

1,816,387

UNITED STATES PATENT OFFICE

ELMORE WILLIAM MENNINGER, OF LOS ANGELES, CALIFORNIA

FURRING CONSTRUCTION

Application filed December 10, 1925. Serial No. 74,469.

This invention relates to furring constructions and more especially to that type of furring construction employing spacer nails having legs of unequal length, one of the legs being pointed for driving and the other having a blunt end to limit the distance that the spacer nail is driven into the support or (in other words) to predetermine the distance that the spacer nail projects from the support so that the reinforcement or other foundation member, which is to be engaged in the head and between the legs of the spacer nail or fastener will not be forced too closely or tightly against the support and neither the spacer nail nor the reinforcement be deformed when the blunt end of the spacer nail engages the support or other member against which it is driven.

An object of the invention is to make provision for predetermining by a simple construction the spacing of reinforcement or other foundation members from the supports.

Another object is to provide a construction of spacer nails that will positively grip the reinforcement or other foundation member so as to positively space said member a predetermined distance from the support into which the spacer nail is driven.

The spacer nails employed by me are U-shape and, in this respect, resemble staples, but they differ from staples in that the legs are of unequal lengths and the longer or driving legs are pointed for driving, the shorter or furring legs generally being blunt at their tips so as to indicate in a positive manner to the workman driving the nails when to cease driving them in order that the nails may project a predetermined distance from the supports. Thus, when the reinforcement or other foundation member is positioned in the bight of the nail, predetermined spacing of the reinforcement or other foundation member from the support, into which the nail is driven, is had.

The legs are substantially in parallelism, as in staples, so as to facilitate driving of the nail and, particularly, to insure that the shorter leg will remain unbent, when driven, so that the nail will project a predetermined distance from the support.

In some instances I prefer to construct the long pointed end of the nail so that, when said nail is being driven, it will turn about the axis of the longer leg, thus causing the shorter leg to move in an arc. The purpose of this is to kink the reinforcement or other foundation member engaged by the nail so as to tend to pull taut said member between its supports. This turning of the nail may be caused by cutting the end portion of the longer leg along a helical path or twisting the end portion of the longer leg to form a screw thread.

In some instances I prefer to make the head portion adjacent to the longer or driving leg substantially at a right angle to said leg in order to secure increased driving speed with less effort; also to make that portion of the head adjacent to the shorter or furring leg curved to more or less fit the reinforcement or other foundation member engaged by the nail.

In some instances it will be found of advantage to produce an upset end on the shorter leg so as to increase the area of contact of said end with the member against which it is stopped in driving, thus further insuring against the shorter leg penetrating said member.

In some instances I prefer to provide a projection on the face of one of the legs. This projection, in this instance, is a hooked portion or shoulder produced by the end portion of the shorter leg being bent upon itself, thus also increasing the area of the tip of the shorter leg. The shoulder or projection thus formed will engage beneath the member that is to be furred so as to positively hold it at a predetermined distance from the support in which the nail is driven.

In some instances I provide a projection on the inner face of either or both legs in the form of barbs and such barbs may be made in any suitable manner, as, for example, by notching the legs transversely on their inner faces.

In some instances the nails will be coated with a binding and pliable resinous or other similarly tacky and yielding material possessing the quality of bonding the nail in the support and protecting, in some instances, the members otherwise in metallic contact in the structure against frequent consequent oxidation, and insulating, in some instances, the members forming the structure against the transmission of sound waves ordinarily transmitted by the nail; thus, I have discovered a treatment for metallic fastening members for structures of the type herein described increasing the holding strength of said fastening members and at the same time preventing or minimizing contact oxidation of the metallic members employed in the structure at points where metallic fastening members engage the reinforcement or other foundation member as well as producing an effective resistant to the transmission of sound waves ordinarily transmitted by metallic fastening members.

I have discovered that, with the type of structure herein described wherein dissimilar metals are in contact, the coating as aforesaid of metallic fastening members, possessing highly corrosive-resistant properties, in a furring construction embodying a reinforcement or other foundation member formed of ordinary iron or steel, makes possible a practically everlasting structure. Therefore, I preferably make the nails that are to be coated from corrosion-resisting metal.

The invention is especially useful in the lathing profession and may be found desirable in various building applications, as, for example, in the placing of reinforcement members in cement-concrete form work, in which instance the spacer nails will be driven into the wooden forms. Also the invention may be used with success in the securing of a trellis or wires for vines where it is desirable to space the trellis or wires from the supporting structure.

This application contains subject matter divided out of my prior application, Serial No. 637,537, filed May 8, 1923.

The accompanying drawings illustrate several forms of the invention.

Figure 1 is a perspective view of a fragment of one form of furring construction embodying the invention.

Fig. 2 is an enlarged side elevation of the spacer nail shown in Fig. 1.

Fig. 3 is an enlarged plan section of the nail on the line indicated by 3—3, Fig. 2.

Fig. 4 is a perspective view of a fragment of a second form of furring construction embodying the invention.

Fig. 5 is an enlarged side elevation of the spacer nail employed in Fig. 4.

Fig. 6 is an enlarged end view of the longer leg of the nail in Fig. 5.

Fig. 7 is a side elevation of a modified form of spacer nail.

Fig. 8 is an enlarged end view of the longer leg of the nail in Fig. 7.

Fig. 9 is a perspective view of a fragment of another modification of furring construction embodying the invention.

Fig. 10 is an enlarged side elevation of the spacer nail employed in Fig. 9.

Fig. 11 is an enlarged end view of the longer leg of the nail in Fig. 10.

Fig. 12 is a fragmental sectional elevation on the line indicated by 12—12, Fig. 9.

Fig. 13 is a perspective view of a fragment of a still further modification of furring construction embodying the invention.

Fig. 14 is an enlarged side elevation of the nail employed in Fig. 13.

First referring to the form of the invention shown in Figs. 1 to 3, inclusive, there is provided a reticulated reinforcement member or other suitable form of reinforcement and, in this instance, the reticulated reinforcement member comprises crossed rods or wires 21, 22, which, preferably, are welded or otherwise secured to one another at their crossing points. The members 21, 22 may be of oxidizable metal, if desired, since said members may be embedded in the cementitious material which is indicated at $a$ in Fig. 1.

The reinforcement 21, 22 may be connected with a suitable support, such as that indicated at $b$ in Fig. 1, but spaced therefrom by furring members, only one of which is indicated at 23. The furring member 23 is preferably formed of spring wire and extends along one side of the reticulated member, mainly out of contact therewith, but in contact at intervals. The contacting portions are in the form of projections or bows 24, each of which is secured, in the instance illustrated, to one of the wires 21 entering into the construction of the reticulated member. For example, the projections 24 may be secured to the wires 21 by fusing or welding.

The furring member 23 is provided with portions 25 spaced from the reticulated member to fur or space the reticulated member from the support $b$ to which it is to be connected, so that, when the cementitious material is being applied to form the slab $a$, said material will flow entirely around the reticulated member and completely embed or encase said member.

It will be readily understood that, if the mesh of the reticulated member be sufficiently small or fine, a backing will not be necessary to prevent the cementitious material from falling out of place while being applied, but, when the mesh is comparatively large or coarse, it may be desirable that a backing, such as that indicated at 26, be employed. The backing 26 may be constructed in a manner and of materials to give it thermal or/and sound insulating properties.

In the instance shown in Fig. 1, the backing 26 is placed between the reticulated member and the furring members and this may be done at the factory before the furring members are secured to the reticulated member.

It is desirable to space the backing 26 from the reticulated member and to space the reticulated member from the support $b$ to which it is to be secured and, in this instance, these functions are performed by the member indicated at 27. In Fig. 1 the support $b$ is formed of wood and the member 27 constitutes a U-shape spacer nail driven into the support $b$ so as to hook over or embrace one of the wires or other element of the reticulated member. In this instance, the spacer nail is driven into the support $b$ at the junction of two of the wires 21, 22 of the reticulated member, so that said nail crosses said wires at their junction.

The member 27 is preferably provided with a coating 28, preferably formed of material that is both tacky and yielding to the touch and resistant to chafing and moisture. For example, the coating may be of suitable resinous material and may be applied in two coats, in which instance, one coat will be, preferably, soft and one coat will be, preferably, hard. The purpose of this is to secure a coating possessing a relative fixedness combining a certain pliableness serving to cement the member 27 in the support as well as protecting the member 27 and the wires 21, 22 against oxidation through metallic contact at points where the member 27 engages said wires and insulating the member 27 so as to avoid or limit the passage of noises between the furring construction by means of said member 27.

It will be readily understood that if a staple were employed for securing the reticulated member to the support, the erector would not know to what depth the staple could be driven without bending the reticulated member closer to the support than the spacing determined by the furring member 23. This, for the reason that a staple has both of its legs sharpened so as to readily penetrate the wood. The member 27 is not a staple and, therefore, I distinguish it in terminology from a staple by employing the term U-shape spacer nail. The legs of the member 27 are in parallelism and of unequal lengths, the longer or driving leg 29 being pointed as at 30 and the shorter or furring leg 31 having a blunt end or tip 32 that engages the outer face of the backing 26 so as to limit the distance that the member 27 penetrates the support. The member 27 may slightly compress the backing 26, as indicated at 33, against the support and will infrequently perforate and pass through the backing and stop against the support $b$.

The foregoing will make clear how the invention is made and used and the operation of securing the reinforcement foundation in place may be briefly described as follows:

The supports $b$, only one of which is shown in Fig. 1, being in place, the workman will place the reinforcement foundation with the backing 26 against the support, and he will drive the nail 27, with the legs embracing one or more wires of the reticulated member, into the support until the blunt end 32 is stopped by compressing the backing against the support. It is to be understood that the distance from the under side of the cross head or leg-connecting portion 34 of the nail to the blunt end 32 will be substantially equal to the height of those portions of the projections 24 that extend from the backing to the reticulated member plus the thickness of the reticulated member at the junction of the wires 21, 22, so that the reticulated member will lie substantially in a plane and not be bent closer to the plane of the supports at one place than another. The leg-connecting portion 34 is substantially straight from end to end.

After the reinforcement foundation is in place, the workman will spread upon the same the plaster or other cementitious material that is to enter into the slab construction, pressing the cementitious material through the mesh of the reticulated member and against the backing 26, completely embedding the reinforcement and hence shielding the reinforcement from external moisture, thus minimizing oxidation of the reinforcement.

It is desirable, though not absolutely necessary, to construct the furring member 23 of non-oxidizable metal, that is, corrosion-resisting metal; which term "non-oxidizable" I distinguish from that class of corrosion-resisting metals inducing oxidation in contact with the ordinary irons and steels. It will be noted that the projections 24 pass through openings or slots 35 in the backing 26.

The reinforcement foundation above described, and illustrated in Fig. 1 of the drawings, is the subject of my copending application for Letters Patent, Serial No. 191,886, filed May 16, 1927.

Now referring to the modification illustrated in Figs. 4, 5 and 6 of the drawings, the elements that functionally correspond with those described above will be indicated by the same reference characters with the addition of the letter $a$. In this instance, the reticulated member comprising the wire strands 21$a$ is not only secured to the support *ba* and held against movement away from said support by the nail 27*a*, but said nail is constructed to hold the reticulated member a predetermined distance from the support. To accomplish this, the legs 29*a*, 31*a* are provided on their inner faces with inward projections, shoulders or barbs 36 which may be formed by transversely notching said legs as at 37. The area of the blunt end 32*a*, in this instance, is increased by upsetting said end or otherwise forming a head-like enlargement, projection or shoulder on the tip of the shorter leg 31*a*, and the tip 32*a* has a preferably convex surface.

The pointed end 30*a* is cut in a helical path or twisted to form a screw thread 38 so that when the nail is being driven, it rotates or turns about the axis of the longer leg, thus kinking the reticulated member so as to stretch the same between adjacent nails. Besides this stretching of the wire strands it is to be noted that rotation of the nail clamps the reticulated member securely between the opposed projections, shoulders or barbs 36 so as to positively hold the reticulated member a predetermined distance from the support. Thus, the nail 27*a* accomplishes the same thing as the projections 24 on the furring members 23 and, therefore, it is evident that when the barbs 36 are used the furring member 23 is not required. When the cementitious material is applied to the reticulated member, the barbs 36 prevent the reticulated member from being forced against the backing and, thus the cementitious material will pass through the mesh of the reticulated member so as to perfectly embed said reticulated member in the cementitious material. The leg-connecting portion 34*a* is substantially straight from end to end.

In Fig. 7 is shown a slightly modified form of spacer nail, the parts that are the functional equivalents of those shown in Fig. 2 being indicated by the same reference characters, with the addition of the letter *b*. The elements that are different from those shown in Fig. 2 and similar to those shown in Fig. 5 are indicated by the same reference characters as used to indicate said elements in Fig. 5, with the addition of the letter *b*. In this instance, the shorter leg 31*b* is provided on its inner face with a projection by having its end portion bent upon itself, as indicated at 39, so as to form a shoulder 40 between which and the cross head 34*b* the reticulated member is caught when the nail is driven and rotates about the axis of its longer leg. In this instance, that part of the leg-connecting portion 34*b* that lies adjacent to the longer leg is substantially at a right angle to said longer leg and that part of the leg-connecting portion that is adjacent to the shorter leg is rounded, as indicated at 41, so as to substantially fit the strands of the member indicated in dotted lines 21*b*.

The nail 27*b* may be made, if desired, of semisoft metal so that the bent end 40 will spread away from the remainder of the leg 31*b* in driving to thus more firmly grip the wire strands 21*b*.

Now referring more particularly to Figs. 9 to 12 of the drawings, the elements that are functionally the equivalents of those described above in connection with Fig. 1 are indicated by the same reference characters with the addition of the letter *c*, and the parts that are different from those shown in Fig. 1 and functionally the same as those shown in Fig. 5, are indicated by the same reference characters employed in Fig. 5 with the addition of the letter *c*, and those parts that are different from those in Fig. 1 and functionally the same as those in Fig. 7 are indicated by the same reference characters used in Fig. 7 with the addition of the letter *c*.

In Fig. 9, the furring members 23*c* is in the form of a spiral and certain of its coils are secured at one side thereof by staples 42 to the support *bc*. The spiral formation of the furring member 23*c* may be secured by winding the wire upon a mandril, said wire coils being spread to the desired spacing and then hardened to give said member a spring quality, or the wire may be coiled and hardened without spreading and then be pulled out so as to spread the coils to a very great degree and the wire will then be secured at intervals by the staples 42 to the support *bc*. The staples 42 will be driven into the support at the points at those sides of the coils that lie closest to the support. Naturally, the furring member 23*c* will tend to spring away from the support at points intermediate of the staples 42 and at such intermediate points the nails 27*c* will be driven so that the legs of the nail embrace the wires 21*c*, 22*c* at a junction point of said wires, and said legs will also embrace the furring member 23*c*, thus connecting the other sides of the wire coils 23*c* to the wires 21*c*, 22*c* forming the reticulated member.

The nail 27*c*, besides having the curved portion 41*c*, is recurved at 43 where the shorter leg joins the curved end 41*c* of the leg-connecting portion 34*c*, so as to form, in this instance, an inward projection or shoulder adapted to extend beneath the reticulated and furring members and to engage with them. Thus, when the cementitious material *ac* is applied to the reticulated member and forced through the mesh thereof, the furring member at points intermediate of the staples 42, together with the reticulated member, will be held at a predetermined distance from the support into which the nail 27*c* is driven. In view of the furring member 23*c* being spring material, I may, in some instances, omit the shoulders 43 of the nail 27c, since the wire coils 23c will tend to hold the reticulated member at a predetermined distance from the support. The barbs 36c, in this instance, are produced by making the notches 37c longitudinally of the leg 29c and said barbs will engage one of the wires 22c of the reticulated member to still further insure against the reticulated member being pressed toward the support when the cementitious material is being applied. By reason of the direction of the notches 37c, it is to be noted that the barbs 36c will tend to prevent the wire 22c engaged by the nail from slipping lengthwise.

In Figs. 13 and 14, I have shown a still further modification of the invention, the reticulated member being, in this instance, expanded from sheet metal and the parts that are the functional equivalents of those described for Figs. 1 to 3 are indicated by the same reference characters, with the addition of the letter d. Besides the difference in form of the reticulated member 21d, the nail 27d is slightly different from the nail 27 at the leg-connecting portion 34, as it has the curved portion 41d corresponding to the curved portion 41 in Fig. 7, and the leg-connecting portion 34d also is curved at 44 at that portion that lies adjacent to the longer leg 29d of the nail, so that the leg-connecting portion is a half-circle. The curved portions 41d, 44 enable the nail to closely fit the reticulated member 21d at the junction of the angular bars thereof so that the reticulated member will be firmly held and so that that portion within the bight of the nail will not be crushed down flat upon the support, thus insuring definite spacing of the head of the nail from the support by reason of the blunt end 32d engaging the support when the nail is driven. The nail 27d, because of its form, is preferably a semi-hard metal, in order that the nail when driven will not bend.

I am aware of double pointed staples being employed in which the legs are of unequal lengths, and I am also aware of V-shape and L-shape nails having but one end pointed, but I am not aware that my type of fastener having legs substantially in parallelism and of unequal length, one pointed and the other blunt, has ever been employed for securing a furring effect as disclosed by me.

I am aware that it is not new to secure rotation of a nail-like fastening by making a screw-like point thereon, but I am not aware that this feature is old in combination with a projection on the face of one of the legs adapted to grip the member embraced by the legs of the staple-like nail.

I claim:

1. The combination with a support of a metallic member, and a U-shaped spacer nail having legs of unequal lengths, the longer leg pointed and penetrating the support and the shorter leg having a blunt end limiting the depth of penetration of the nail, and one of the legs having an integral rigid shoulder extending toward the outer end of the nail to engage and hold the metallic member a predetermined distance from the support.

2. The combination with a support of a metallic member, and a U-shaped spacer nail having legs of unequal lengths, the longer leg pointed and penetrating the support and the shorter leg having a blunt end limiting the depth of penetration of the nail, one of the legs having an integral shoulder and the longer leg having a screw thread to turn it when driven to engage the shoulder with the metallic member.

3. A spacer nail comprising a U-shape member having legs of unequal lengths, the longer leg pointed and the shorter leg having a blunt end, and one of the legs having a rigid shoulder upwardly extended and adapted to support a strand of wire netting.

4. A spacer nail comprising a U-shape member having legs of unequal lengths, the longer leg pointed and the shorter leg having a blunt end portion approximately parallel to the longer leg, and the longer leg being twisted to form a partial screw thread operative to turn it when being driven.

5. A spacer nail comprising a U-shape member having legs of unequal lengths, the longer leg pointed, and the shorter leg having a blunt end portion approximately parallel to the longer leg and the shorter leg having a deformed portion comprising a rigid inwardly thence upwardly extended end to provide a shoulder.

6. A spacer nail comprising a U-shape member having legs of unequal lengths, the longer leg pointed and being cut and twisted to form a partial screw thread to turn it when being driven, and the shorter leg having a deformed inwardly extended rigid portion to form a shoulder between said legs.

7. A spacer nail comprising a U-shape member having legs of unequal lengths, the longer leg pointed and having a screw thread to turn it when being driven, the shorter leg having a blunt end, and one of said legs having a projection approximately on its inner face.

8. The combination with a support of a reinforcement member, and a U-shape spacer nail engaging the reinforcement member and having legs of unequal lengths, the longer leg pointed and penetrating the support and the shorter leg having a blunt end portion approximately parallel to the longer leg and limiting the depth of penetration of the nail, one of said legs having a rigid shoulder extending between said legs.

9. The combination with a support of a metallic member, and a U-shape spacer nail having legs of unequal lengths, the longer leg pointed and penetrating the support and the shorter leg having a blunt end limiting the depth of penetration of the nail, and the longer leg having a screw thread to turn it when driven and the shorter leg having a deformed portion to provide a shoulder engaging beneath said member.

10. A spacer nail comprising a U-shape member having legs of unequal lengths, the longer leg pointed and the shorter leg having a deformed portion to provide a shoulder, and one of said legs having a projection approximately on its inner face.

11. A spacer nail comprising a U-shape member having legs of unequal lengths, the longer leg pointed and having a screw thread to turn it when being driven, the shorter leg having a deformed portion to provide a shoulder, and one of said legs having a projection approximately on its inner face.

12. A spacer nail comprising a U-shaped member having oppositely disposed and approximately parallel portions of unequal lengths, the longer portion pointed and the shorter portion having a blunt end and a rigid shoulder extending from one leg toward the other and lying between said legs.

13. A spacer nail comprising a U-shape member having legs of unequal lengths, the longer leg pointed and having a screw thread to turn it when being driven, the shorter leg having a blunt end, and one of the legs having a shoulder rigid therewith and extending between said legs.

14. The combination with a support of a reticulated member, a backing material, a furring member connected with the reticulated member for supporting the backing material spaced from the reticulated member, and a U-shape spacer nail having oppositely disposed and substantially parallel legs of unequal lengths engaging the reticulated member within the bight of the nail, the longer leg being pointed and penetrating the backing material and the support and the shorter leg being blunt and limiting the penetration of the longer leg; the arrangement being such that the reticulated member may be completely enclosed within cementitious material.

15. A spacer nail comprising a U-shape member having legs of unequal lengths, the longer leg pointed and the shorter leg having a portion near its end approximately parallel to the longer leg, and the shorter leg having a deformed rigid portion approximately on its inner face and lying between said legs to provide a shoulder.

16. A spacer nail comprising a U-shape member having spaced and approximately parallel portions near the leg ends, means on the member for penetrating a support and for limiting the penetration of the member, and other integral rigid means on one of the legs adapted to receive and retain a portion of a reticulated or other member and between the legs of the U-shape member spaced from said support.

17. A spacer nail comprising a substantially U-shape member having legs of unequal lengths, means on the member for penetrating a support and for limiting the penetration of the member, and means on the shorter leg adapted to receive and retain a portion of a reticulated or other member within the bight of the U-shape member spaced from said support.

18. A spacer nail comprising a U-shape member having legs of unequal lengths, the longer leg pointed and having a screw thread to turn it when being driven, the shorter leg having a portion near its end approximately parallel to the longer leg, and one of the legs having a rigid shoulder extended between said legs.

19. A spacer nail comprising a U-shape member having legs of unequal lengths, the longer leg pointed and having a screw thread to turn it when being driven, the shorter leg having a portion near its end approximately parallel to the longer leg, and the shorter leg having a deformed portion to provide a shoulder.

20. A spacer nail comprising a U-shape member having legs of unequal lengths, the longer leg pointed and having a screw thread to turn it when being driven, the shorter leg having a blunt end portion approximately parallel to the longer leg, and the shorter leg having a deformed portion to provide a shoulder.

21. The combination adapted to be secured to a support, of a backing material, a reticulated member, a furring member for supporting the backing material spaced from the reticulated member and formed with projections at intervals permanently and positively connected with the reticulated member, and a spacer nail for engaging the reticulated member with the support and comprising a substantially U-shape member having legs of unequal lengths and spaced and approximately parallel portions near the leg ends and provided with integral means for penetrating the backing material and said support and for limiting the penetration of the member to maintain substantially the previously determined spacing of the reticulated member from the backing material to permit the reticulated member to be completely enclosed within cementitious material applied thereto.

Signed at Los Angeles, California, this 4th day of December, 1925.

ELMORE WILLIAM MENNINGER.